H. S. FRANK.
PROCESS OF MAKING PISTON RINGS.
APPLICATION FILED DEC. 7, 1918.
1,337,551. Patented Apr. 20, 1920.
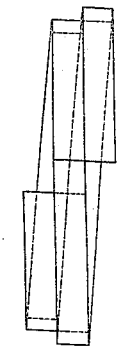
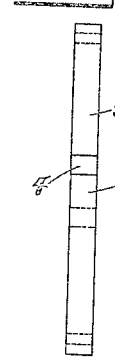
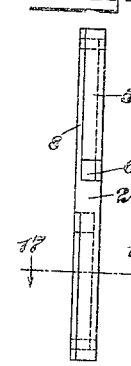
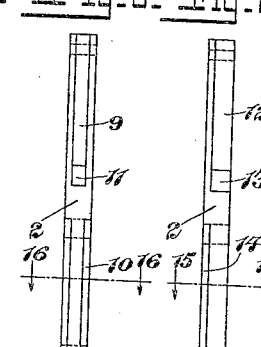
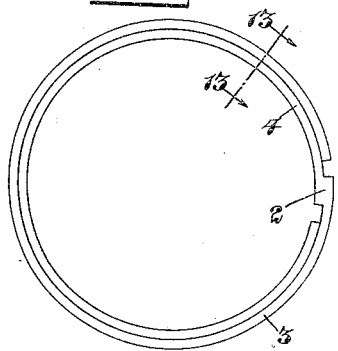
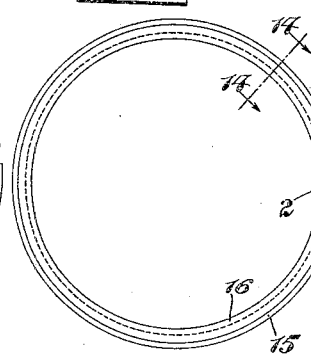
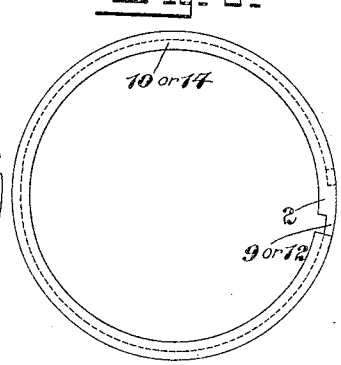
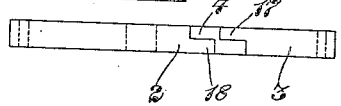
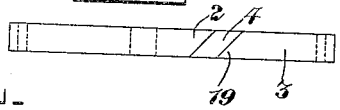
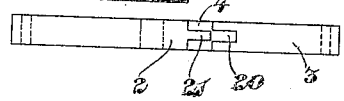
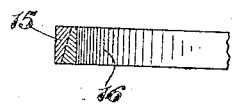
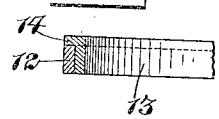
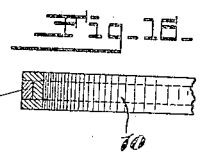
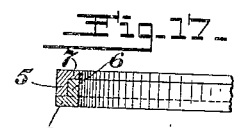
Attest.
Charles A. Becker.
Inventor.
Harry S. Frank,
By Rippey & Kingsland,
His Attorneys.

UNITED STATES PATENT OFFICE.

HARRY S. FRANK, OF ST. LOUIS, MISSOURI.

PROCESS OF MAKING PISTON-RINGS.

1,337,551.   Specification of Letters Patent.   Patented Apr. 20, 1920.

Application filed December 7, 1918. Serial No. 265,722.

*To all whom it may concern:*

Be it known that I, HARRY S. FRANK, a citizen of the United States, residing at the city of St. Louis and State of Missouri, have invented a new and useful Process of Making Piston-Rings, of which the following is a specification.

This invention relates to the art of manufacturing piston rings.

An object of the invention is to provide a novel process for use in the art of manufacturing piston rings, whereby rings may be produced each of which is composed of a single piece of metal in the form of two bands or rings, one of which is within the other and having integral connection at one point, leaving one end of each band or ring disconnected from the other to permit free contraction and expansion of the ring.

Another object of the invention is to provide a process of manufacturing piston rings of the construction stated, involving the application of pressure to a spiral band to retain the same in position to form an inner and an outer band or ring, and the treatment of the material to change the molecular construction or arrangement and set the material in the desired shape.

Other objects of the invention will appear from the following description, reference being made to the accompanying drawings illustrating rings in different stages of their manufacture, and in which Figure 1 is an elevation of a blank from which the ring may be made.

Fig. 2 is a similar elevation of the blank after it has been cut to form a spiral band.

Fig. 3 is an elevation of a finished ring made from the spiral band illustrated in Fig. 2.

Figs. 4, 5 and 6 are elevations of modified forms of rings which may be made by my improved process.

Fig. 7 is a side elevation of the ring shown in Fig. 3.

Fig. 8 is a side elevation of another form of ring.

Fig. 9 is a side elevation of the types of rings illustrated in Figs. 5 and 6.

Figs. 10, 11 and 12 are views illustrating different joints for the ends of rings.

Fig. 13 is a cross sectional view on the line 13—13 of Fig. 7.

Fig. 14 is a cross sectional view on the line 14—14 of Fig. 8.

Fig. 15 is a cross sectional view on the line 15—15 of Fig. 6.

Fig. 16 is a cross sectional view on the line 16—16 of Fig. 5.

Fig. 17 is a cross sectional view on the line 17—17 of Fig. 4.

The form of blank specifically illustrated in Fig. 1 is for the manufacture of the ring shown in Figs. 3 and 7; and it will be understood that in case it is desired to manufacture other forms of rings as, for instance, those illustrated in Figs. 4, 5, 6 and 8 the blank will be of the desired shape having the necessary flanges for the production of the rings desired. Whatever the form of the blank may be, the first step after the formation of the blank is the step of cutting or sawing the blank to provide the spiral element, one form of which is shown in Fig. 2. The cut or slot 1 which is formed is continuous so that the length of the spiral element which is formed is almost double the circumference of the blank. The spiral element which is formed by cutting is capable of being pressed or telescoped to place one of the bands or rings thereof within the other. As will readily be understood by reference to the drawing the spiral element is shouldered or off-set, as shown at 2 (Fig. 2), thus really providing two spiral bands which are integrally united; one of which bands is adapted to be telescoped within and encircled by the other.

After the spiral element has been formed the two integrally united bands or rings are pressed together, one within the other, and while retained in that position or adjustment they are subjected to treatment in order to change the molecular arrangement thereof and set the material in the changed shape so that when the pressure is removed the product that remains will consist of a ring composed of an outer band and an inner band integrally united at one end and having their opposite ends free in order to permit proper functioning of the device as a piston ring.

The treatment to which the ring is subjected while under pressure may include heating the ring to the proper or necessary temperature to change the molecular arrangement; or the treatment may consist of hammering the ring to attain that result.

After the ring has been produced in that manner the surfaces thereof are ground off or finished.

It is apparent that by use of the process described rings of various forms may be made. For example, the ring illustrated in Figs. 3 and 7 is made from the specific form of blank shown. This ring consists of an outer band or ring 3 and an inner band or ring 4 integrally united with the outer band or ring as shown at 2. The bands 3 and 4 are of equal width and approximately equal radial thickness throughout the circumference of the ring.

The ring illustrated in Figs. 4 and 17 consists of an outer band 5 and an inner band 6 integrally united at 2 as in the case of the ring shown in Fig. 3. The outer band 5 is formed with an inwardly extending flange 7, the inner periphery of which is flush with the inner periphery of the band 6; and the inner band 6 is provided with a circumferential flange 8 the outer edge of which is flush with the surface of the band 5.

The form of ring illustrated in Figs. 5 and 16 is composed of an outer band 9 and an inner band 10 integrally united at 2, and having a circumferential groove 11 in which the outer band is seated. The groove 11 is of sufficient depth to receive the outer band so that the periphery of the outer band is flush with the periphery of the inner band at each side of the groove.

The ring illustrated in Figs. 6 and 15 is composed of an outer band 12 and an inner band 13 integrally united at 2 as in the case of the other rings described. The outer band 12 is of less width than the inner band, the latter being formed with a circumferential flange 14 at one side of the band 12, and having its edge flush with the periphery of the band 12.

The form of ring illustrated in Figs. 8 and 14 is composed of an outer band 15 and an inner band 16 integrally united at 2. The bands 15 and 16 have matching inclined surfaces which contact with each other as shown in Fig. 14, so that there is a slight tendency for the inner band to press the outer band laterally toward one side, thus closing the groove in the piston in which the ring may be mounted.

Various other forms of rings may readily be made by use of my improved process and I do not confine myself to the specific forms shown. It will be apparent also that various forms of joints may be provided for closing the space between the end of the outer band and the adjacent shoulder 2 uniting the inner and outer bands. For instance, as shown in Fig. 10, the end of the outer band may be formed with a projection 17 adapted to extend into a notch or recess at the side of the shoulder 2 and overlap a matching projection 18 on the shoulder 2. Thus, the space between the end of the outer ring and the shoulder will be closed when the ring is compressed. If desired, the end of the outer ring may be formed at an angle as shown in Fig. 11, in which the outer ring has an angular terminal 19 adapted to coöperate with a similarly shaped wall on the shoulder 2. The form of the joint illustrated in Fig. 12 includes a notch 20 in the end of the outer band and a projection 21 on the shoulder 2 adapted to be received within the notch 20 and thus close the space and prevent the passage of gas when the ring is compressed within the cylinder.

It is obvious that various other forms of joints may be provided in order to prevent the passage of gas or steam between the end of the outer band or ring and the adjacent shoulder.

It is well known that a piston ring must be of a diameter larger than the internal diameter of the cylinder in which it is to be used. In the manufacture of piston rings heretofore in some cases the rings have been made from blanks of a diameter which is too small for the cylinders in which it is desired to use the rings. In such cases the rings are expanded to the desired dimensions and set in their expanded shape so that they will impart the necessary pressure against the cylinder walls in the operation of the piston. In other cases rings have been made from blanks of the desired size so that it is unnecessary to expand the rings. It is obvious that rings may be manufactured by my improved process in either way; that is to say the rings may be expanded and set in their expanded shape; or, the rings may be made of blanks having the desired diameter and thus avoid the necessity of expanding the rings.

It is obvious that the invention is not restricted to unessential details and that the order of procedure may be varied in certain respects without departure from the scope of the appended claims.

What I claim and desire to secure by Letters Patent of the United States, is:—

1. The process of manufacturing piston rings, which consists in changing the shape of a spiral element to form an inner band and an outer band encircling the inner band; and heating the element until the tension of the metal is changed and set in the changed shape.

2. The process of manufacturing piston rings, which consists in changing the shape of a spiral element to form an inner band and an outer band encircling the inner band;

heating the element until the tension of the metal is changed and set in the changed shape; and finishing the ring.

3. The process of manufacturing piston rings, which consists in changing the shape of a spiral element to form an inner band and an outer band encircling the inner band.

4. The process of manufacturing a piston ring, which consists in changing the shape of a spiral element to form an inner band and an outer band encircling the inner band, and having its side edges in the same planes with the side edges of the inner band.

5. The process of manufacturing a piston ring, which consists in changing the shape of a spiral element to form an inner band and an outer band encircling the inner band, and having its side edges in the same planes with the side edges of the inner band; and setting the tension of the metal in the changed shape.

6. The process of manufacturing piston rings, which consists in changing the shape of a spiral element to form an inner band and an outer band encircling the inner band; and setting the tension of the metal in the changed shape.

7. The process of manufacturing piston rings, which consists in changing the shape of a spiral element to form a ring composed of an inner band and an outer band encircling the inner band; setting the tension of the metal in the changed shape; and finishing the ring to form the side edges of the inner and outer bands in proper planes.

HARRY S. FRANK.